F. SCHWEIZER.
MACHINE FOR CUTTING THREADS ON BOLTS OR NUTS.
No. 2,889. Reissued Mar. 3, 1868.
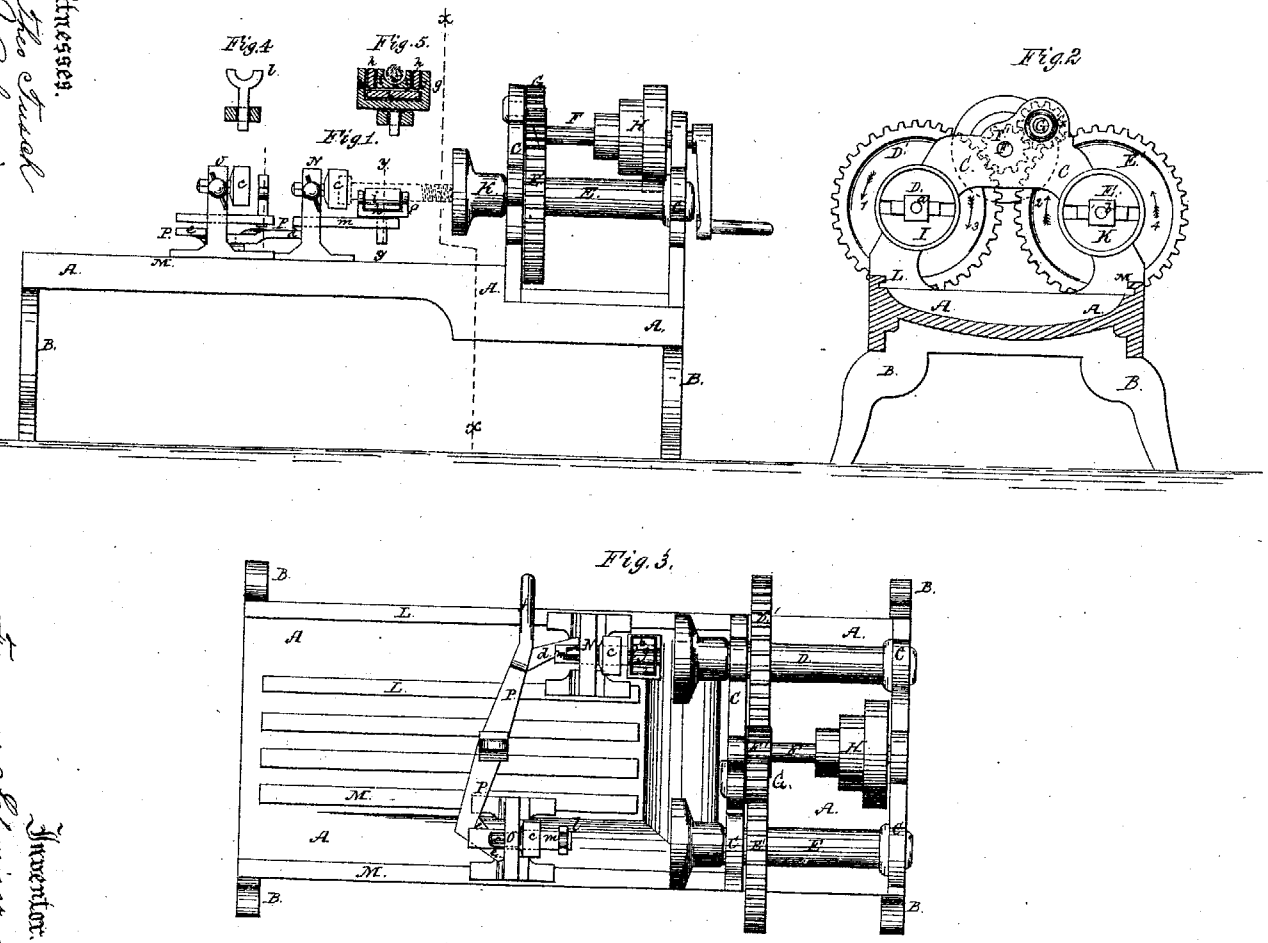
Witnesses.
Theo Tusch
J. A. Service.
Inventor.
Francois Schweizer
Per Munn & Co
Attorneys.

UNITED STATES PATENT OFFICE.

SCHWEITZER PATENT BOLT COMPANY, OF NEW YORK, N. Y., ASSIGNEE OF FRANZIS SCHWEIZER, OF SAME PLACE.

IMPROVED MACHINE FOR CUTTING THREADS ON BOLTS OR NUTS.

Specification forming part of Letters Patent No. 62,693, dated March 5, 1867; Reissue No. 2,889, dated March 3, 1868.

*To all whom it may concern:*

Be it known that FRANZIS SCHWEIZER, of New York, county and State of New York, has invented a new and Improved Machine for Threading Bolts and Nuts; and I, H. S. TERBELL, president of the SCHWEITZER PATENT BOLT COMPANY, of the city, county, and State of New York, hereby declare that the following is a full, clear, and exact description thereof, which will enable those skilled in the art to make and use the same, reference being had to the accompanying drawings, forming part of this specification, in which drawings—

Figure 1 represents a side elevation of this invention, partly in section. Fig. 2 is a transverse vertical section of the same, taken in the plane indicated by the line *x x*, Fig. 1. Fig. 3 is a plan or top view of the same. Figs. 4 and 5 are details, which will be referred to as the description progresses.

Similar letters indicate corresponding parts.

This invention relates to a machine for threading bolts or nuts, in which two or more bolts, or two or more nuts or bolts and nuts, can be threaded by the same mechanism with comparatively little expenditure of power.

The invention consists in the arrangement of two or more dies and die-stocks, which are secured to two or more horizontal shafts that are geared together in such a manner that they revolve in opposite directions in pairs, the bolts or nuts being held in vises and fed to the dies, so that a thread will be cut on the bolt or nut held in one vise, while the other is retreated, and vice versa, and the operation of threading bolts or nuts is effected with great rapidity and with little more than half the power required to thread the same number of bolts or nuts in the ordinary apparatus.

A represents the bed of my machine, which is made of cast-iron or other suitable material, and supported by four or more legs, B. On this bed is secured a head, C C, which forms the bearings for the horizontal shafts D, E, and F. On each of the horizontal shafts D E is mounted a gear-wheel, D′ E′, which are geared together by the intermediate pinions, F′ G. The pinion F′ is mounted on the driving-shaft F, to which motion is imparted by a belt running on the cone-pulley H. The pinion G derives its motion from the pinion F′, and it gears into the wheel E′, as seen in Fig. 2, so that the shafts D E are made to revolve in opposite directions—that is to say, when the shaft D turns in the direction of arrow 1 the shaft E turns in the direction of arrow 2, and when the shaft D moves in direction of arrow 3, then the shaft E moves in the direction of arrow 4.

To the end of each of the shafts D E is attached a die-stock, I or K, each of which holds a die, *a* or *b*. These dies will revolve in the same directions as their shafts.

The bed A is provided with two tracks, L M, which form the guideways for the heads N O. Each of these heads is provided with a vise, in which the head of the bolt or the nut to be operated on is held, or the heads of the bolts or the nuts may be secured in a holder, *c*, which is secured in the vise of each sliding head. These heads are fed to the revolving cutters or dies by means of a lever, P, which is pivoted to the bed A between said heads. This lever is provided with two arms, *d* and *e*, and by moving the handle *f* of the lever either forward or backward one or the other of the heads N O is fed up toward its corresponding die. The fulcrum of said lever is adjustable on the bed, so that its position can be regulated to suit the length of different bolts or taps.

In threading bolts I use a yielding rest, *g*, which is attached to the heads N O, and serves to support the bolts to be operated upon by the dies. Said rest is rendered yielding by means of rubber or other suitable springs, *h*, which support two concave metal plates, *i*, the latter forming a semicircular concave rest, as shown more particularly in Fig. 5, which is a transverse vertical section of said rest, taken in the plane indicated by the line *y y*, Fig. 1. The yielding rest is used for bolts with uneven surfaces. If the bolts are made very accurately, a rigid rest, *l*, such as shown in Figs. 3 and 4, will be sufficient. The rest *g* or *l* is attached to a bar, *m*, which slides loosely in one of the heads, N or O.

The operation of the machine in threading bolts is as follows: A bolt is secured in the head N and the machine is set in motion, so that the die *a* revolves in the direction of arrow 3. The end of the bolt is brought in contact with the die by pressing the arm *d* on the lever P against the head N. The die after having started the thread on the bolt will pull the same forward without requiring any further pressure of the lever P. Another bolt is secured in the stock *o*, and as soon as the thread on the first bolt is cut to the required distance the motion of the machine is reversed, the second bolt is fed up to the die *b*, and during the time the first bolt recedes a thread is cut on the second bolt. The first bolt is then removed and replaced by a new blank, and the operation is continued as before. Thus the machine is always operating on and finishing two bolts, while it actually cuts a thread only on one bolt at a time. In threading nuts the operation is precisely the same. The dies *a b* are replaced by taps, and the nuts are secured in the heads N O; or, if desired, the taps might be secured in these heads and the nuts to be threaded in the ends of the spindles D E, although this arrangement would necessitate a frequent stopping of the machine. The number of sliding heads might be increased to three, four, or more, so that two or more bolts or nuts would always be operated upon simultaneously.

What I claim as new, and desire to secure by Letters Patent, is—

1. The sliding or movable heads N O, in combination with the lever P and cutters or dies *a b*, substantially as and for the purpose described.

2. The adjustable lever P, provided with arms *d e*, substantially as and for the purpose set forth.

3. The elastic rest *g*, constructed and operating substantially as and for the purpose shown and described.

H. S. TERBELL,
*President of the Schweitzer Patent Bolt Company.*

Witnesses:
W. HAUFF,
GUSTAV BERG.